US006532258B1

(12) United States Patent
Goldston et al.

(10) Patent No.: US 6,532,258 B1
(45) Date of Patent: Mar. 11, 2003

(54) METHOD FOR ESTIMATING SIGNAL-TO-NOISE RATIO OF DIGITAL CARRIERS IN AN AM COMPATIBLE DIGITAL AUDIO BROADCASTING SYSTEM

(75) Inventors: Don Roy Goldston, Mason, OH (US); Marcus Matherne, West Chester, OH (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/339,362

(22) Filed: Jun. 24, 1999

(51) Int. Cl.[7] ............................................. H04B 17/00
(52) U.S. Cl. ..................... 375/227; 375/216; 375/342; 375/364; 370/514; 370/522
(58) Field of Search .................. 375/227, 232, 375/233, 216, 260, 248, 346, 342, 364, 368; 455/422; 370/514, 522

(56) References Cited

U.S. PATENT DOCUMENTS

| | | | |
|---|---|---|---|
| 5,412,686 A | 5/1995 | Ling | |
| 5,559,830 A | 9/1996 | Dapper et al. | 375/230 |
| 5,588,022 A | 12/1996 | Dapper et al. | 375/216 |
| 5,606,576 A | 2/1997 | Dapper et al. | 375/268 |
| 5,633,896 A | 5/1997 | Carlin et al. | 375/340 |
| 5,673,292 A | 9/1997 | Carlin | 375/269 |
| 5,703,905 A * | 12/1997 | Langberg | 375/232 |
| 5,703,954 A | 12/1997 | Dapper et al. | 381/15 |
| 5,764,706 A | 6/1998 | Carlin et al. | 375/326 |
| 5,809,065 A | 9/1998 | Dapper et al. | 375/216 |
| 5,859,876 A | 1/1999 | Dapper et al. | 375/295 |
| 5,949,796 A | 9/1999 | Kumar | |
| 6,192,238 B1 * | 2/2001 | Piirainen | 455/422 |
| 6,215,818 B1 * | 4/2001 | Velez et al. | 375/233 |
| 6,400,758 B1 * | 6/2002 | Goldston et al. | 375/216 |

FOREIGN PATENT DOCUMENTS

GB     2327176 A     1/1999

OTHER PUBLICATIONS

Kroeger, B., Vigil, A., "Improved IBOC DAB Technology For AM Broadcasting", Oct. 1996.
M. Alard, R. Lassale, "Principles of modulation and channel coding for digital broadcasting for mobile receivers", EBU Review, No. 224, pp. 168–190, Aug. 1987.
Kroeger, B.W., Peyla, P.J., "Robust IBOC DAB AM and FM Technology For Digital Audio Broadcasting", Apr. 1997.

* cited by examiner

Primary Examiner—Shuwang Liu
(74) Attorney, Agent, or Firm—Robert P. Lenart, Esq.; Pietragallo, Bosick & Gordon

(57) ABSTRACT

A method of estimating SNR for a plurality of carriers modulated with digital information, wherein the digital information includes data baud and training baud, comprising the steps of: receiving the plurality of carriers; determining a first SNR for the data baud; determining a second SNR for the training baud; comparing at least one of the first and second SNRs to predetermined selection criteria; and selecting one of the first and said second SNRs based on the comparison step. In the preferred embodiment, the carriers are processed to produce an equalizer output for each of the carriers, and the equalizer output is processed to produce a symbol decision for each of the carriers. The equalizer output is subtracted from the symbol decision when a data baud is received to produce a first difference value, and the first difference value is squared to produce a first signal to noise estimate. The equalizer output is also subtracted from predetermined training data when a training baud is received to produce a second difference value, and the second difference value is squared to produce a second signal to noise estimate. Apparatus that performs the above method is also included.

44 Claims, 5 Drawing Sheets

METHOD FOR ESTIMATING SIGNAL-TO-NOISE RATIO OF DIGITAL CARRIERS IN AN AM COMPATIBLE DIGITAL AUDIO BROADCASTING SYSTEM

BACKGROUND OF THE INVENTION

This invention relates to radio broadcasting and, more particularly, to methods of and apparatus for estimating signal-to-noise ratio (SNR) of digital carriers in an amplitude modulated compatible digital broadcasting system.

There has been increasing interest in the possibility of broadcasting digitally encoded audio signals to provide improved audio fidelity. Several approaches have been suggested. One such approach, set forth in U.S. Pat. No. 5,588,022, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth that encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal.

The waveform in the AM compatible digital audio broadcasting system described in U.S. Pat. No. 5,588,022, has been formulated to provide sufficient data throughput for the digital signal while avoiding crosstalk into the analog AM channel. Multiple carriers are employed by means of orthogonal frequency division multiplexing (OFDM) to bear the communicated information.

Monophonic detectors for consumer AM radios respond only to the envelope and not the phase of the received signal. Because of the use of the multiple digitally modulated carriers, there is a need for a means to reduce the envelope distortion caused by this hybrid signal. U.S. Pat. No. 5,859,876, assigned to the assignee of the present invention, discloses a method for reducing envelope distortion in an AM compatible digital audio broadcasting system. Certain digital carriers that are above the frequency of the analog AM carrier have an associated digital carrier that is at an equal frequency offset below the analog AM carrier. The data and modulation placed on the upper digital carrier and its counterpart are such that the signal resulting from their addition has no component that is in-phase with the analog AM carrier. Digital carrier pairs arranged in this way are said to be complementary. This configuration delivers dramatic fidelity improvements to analog AM reception of AM compatible digital broadcast signals.

At the receiver, the digital signal is demodulated by means of a Fast Fourier Transform (FFT). One possible method and associated apparatus is described in U.S. Pat. No. 5,633,896. That patent discloses a demodulation technique which minimizes the undesired crosstalk between the analog signal and the digital signals in an AM compatible digital audio broadcasting (AM DAB) system using an orthogonal frequency division multiplexed (OFDM) modulation format, by employing dual fast Fourier transform processes on separate respective in-phase and quadrature-phase components of a received OFDM digital signal. The output of the quadrature channel is used to recover the complementary data, and the resultant processed component signals are summed to recover the non-complementary data.

The received multi-carrier signal requires equalization in the presence of dynamic channel response variations. Without such equalization, a very distorted signal would be detected and the digital broadcasting signal information would be unrecoverable. An equalizer enhances the recoverability of the digital audio broadcasting signal information. One such equalizer is disclosed in U.S. Pat. No. 5,559,830. The equalizer disclosed therein includes means for receiving an AM compatible digital audio broadcasting waveform and storing that waveform as a waveform vector. The equalizer then processes that waveform by multiplying the waveform vector by an equalization vector. This equalization vector comprises a plurality of equalizer coefficients, each of the coefficients initially set to a predetermined value. The equalizer then compares each location of the processed waveform vector with a stored waveform vector. The equalizer selects as the signal that vector location closest to the stored waveform vector. Preferably, the equalizer includes means for updating the equalizer coefficients using the waveform vector, the processed waveform vector, and the stored waveform vector to provide immunity to noise and response to changes in the propagation channel.

In the equalizers of both U.S. Pat. No. 5,633,896 and U.S. Pat. No. 5,559,830, frequency domain information is presented to the equalizer as a frequency domain vector. Each block of frequency domain information is stored in a storage array. This storage array vector is multiplied by a plurality of equalizer coefficients. The resulting product of this multiplication is the equalized signal. A set of exact values is known a priori in the equalizer against which each vector location of the equalized signal can be compared. The ideal value closest to that described in the vector location is chosen as the actual signal value. The vector of decisions is stored in a decision array. Using the received signal, the equalized signal and decision array, an equalizer coefficient estimator calculates coefficient estimates. The rate of coefficient update determines equalizer noise immunity and convergence rate. Coefficients in different parts of the band may be updated at different rates depending on knowledge of the distortion mechanism. U.S. Pat. No. 5,633,896 and U.S. Pat. No. 5,559,830 are hereby incorporated by reference.

One proposed AM DAB system uses trellis coded modulation of the digital carriers. When trellis coded modulation is used, enhanced receiver performance may be possible when the received SNR is used in the trellis decoding. This is especially true in OFDM systems where the SNR for some of the carriers may be much different than the SNR of the other carriers due to frequency selective fading or interference that affects only part of the frequency band. Therefore, there is a need for accurate SNR estimates in In-Band On-Channel (IBOC) DAB systems using orthogonal frequency division multiplexing.

SUMMARY OF THE INVENTION

The present invention provides a method of estimating SNR for a plurality of carriers modulated with digital information, wherein the digital information includes data baud and training baud, comprising the steps of: receiving the plurality of carriers; determining a first SNR for the data baud; determining a second SNR for the training baud; comparing at least one of the first and second SNRs to predetermined selection criteria; and selecting one of the first and second SNRs based on the comparison step.

In the preferred embodiment, the carriers are processed to produce an equalizer output for each of the carriers, and the equalizer output is processed to produce a symbol decision for each of the carriers. The equalizer output is subtracted from the symbol decision when a data baud is received to produce a first difference value, and the first difference value is squared to produce a first SNR estimate. The equalizer output is also subtracted from predetermined training data when a training baud is received to produce a second difference value, and the second difference value is squared to produce a second SNR estimate.

The invention also encompasses the operation of radio frequency receivers that utilize the above method, as well as apparatus that performs the above method and radio frequency receivers that include the apparatus.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

The hybrid in-band on-channel (IBOC) digital audio broadcasting system permits simultaneous transmission of analog and digitally encoded audio signals in the same channel. The transmitted signal includes of the current analog AM signal, bandlimited to an audio bandwidth of about 5 kHz, and digital carriers that extend about ±15 kHz from the AM carrier. In addition to transmitting digitally encoded audio, the digital carriers also periodically carry known data called a training sequence. This broadcasting is accomplished by transmitting a digital waveform by way of a plurality of orthogonal frequency division modulated (OFDM) carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
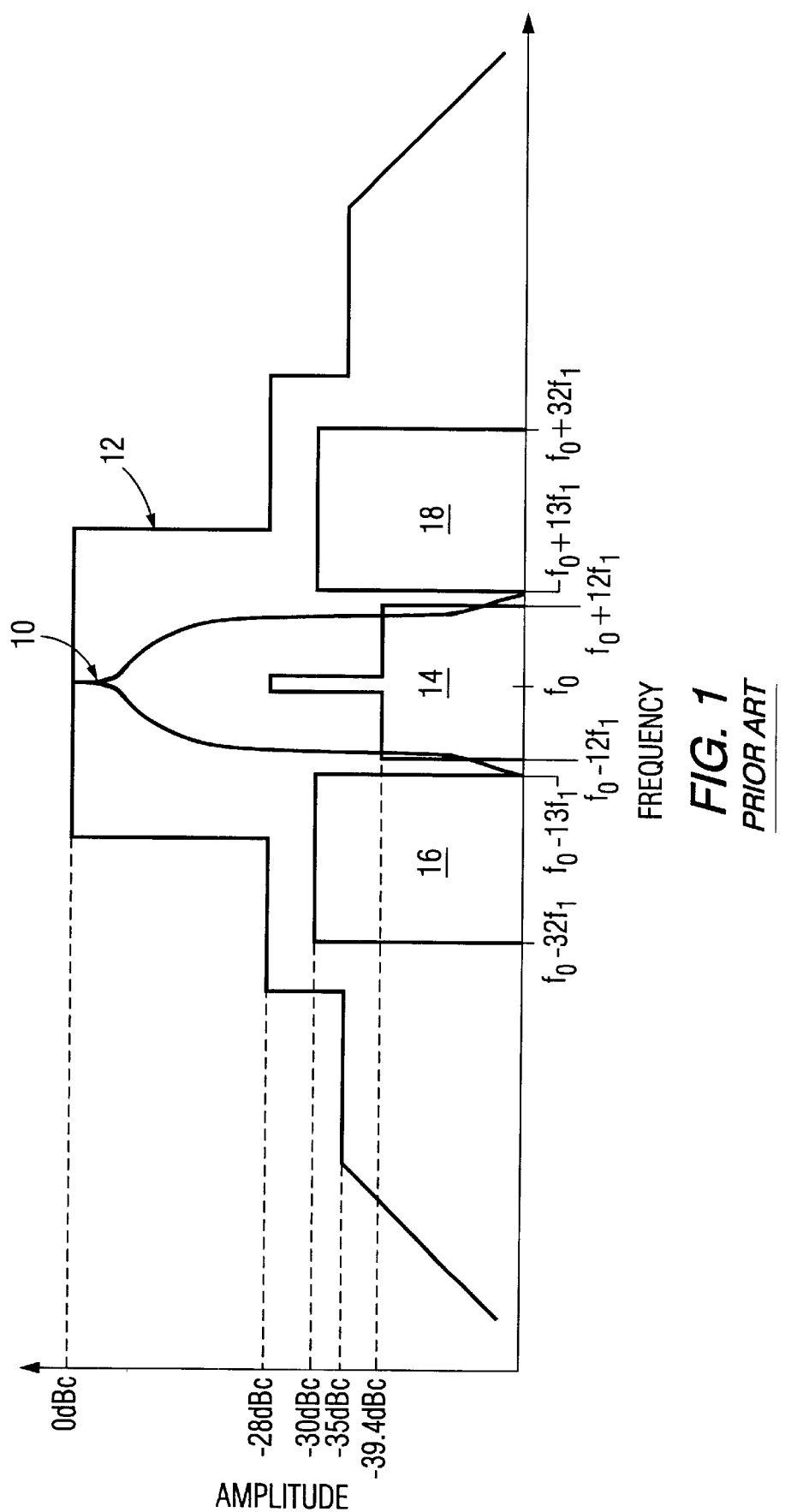
FIG. 1 is a diagrammatic representation of a prior art composite analog AM and digital broadcasting signal.

FIG. 1 shows the spectrum of an AM digital audio broadcasting signal of a type that can be utilized by the present invention. Curve 10 represents the magnitude spectrum of a standard broadcasting amplitude modulated signal, wherein the carrier has a frequency of $f_0$. The FCC emissions mask is represented by item number 12. The OFDM waveform is composed of a series of data carriers spaced at $f_1 = 59.535 \cdot 10^6/(131072)$, or about 454 Hz. A first group of twenty four of the digitally modulated carriers are positioned within a frequency band extending from $(f_0-12\ f_1)$ to $(f_0+12\ f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) and is more fully described in the previously discussed U.S. Pat. No. 5,859,876. Complementary BPSK modulation is employed on the innermost digital carrier pair at $f_0 \pm f_1$ to facilitate timing recovery. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0-11\ f_1)$ to $(f_0-2\ f_1)$ and from $(f_0+2\ f_1)$ to $(f_0+11\ f_1)$ for the 16 kbps encoding rate. For all three encoding rates, the carriers at $(f_0-12\ f_1)$ and $(f_0+12\ f_1)$ carry supplementary data and may be modulated using complementary 32 QAM.

Additional groups of digital carriers are placed outside the first group. The need for these digital waveforms to be in-quadrature with the analog signal is eliminated by restricting the analog AM signal bandwidth. The carriers in a second and a third group, encompassed by envelopes 16 and 18 respectively, may be modulated using, for example, 32 QAM for the 48 and 32 kbps rates, and 8 PSK for the 16 kbps rate. The carriers are set at levels of −30 dBc for all encoding rates.

Figure 2:
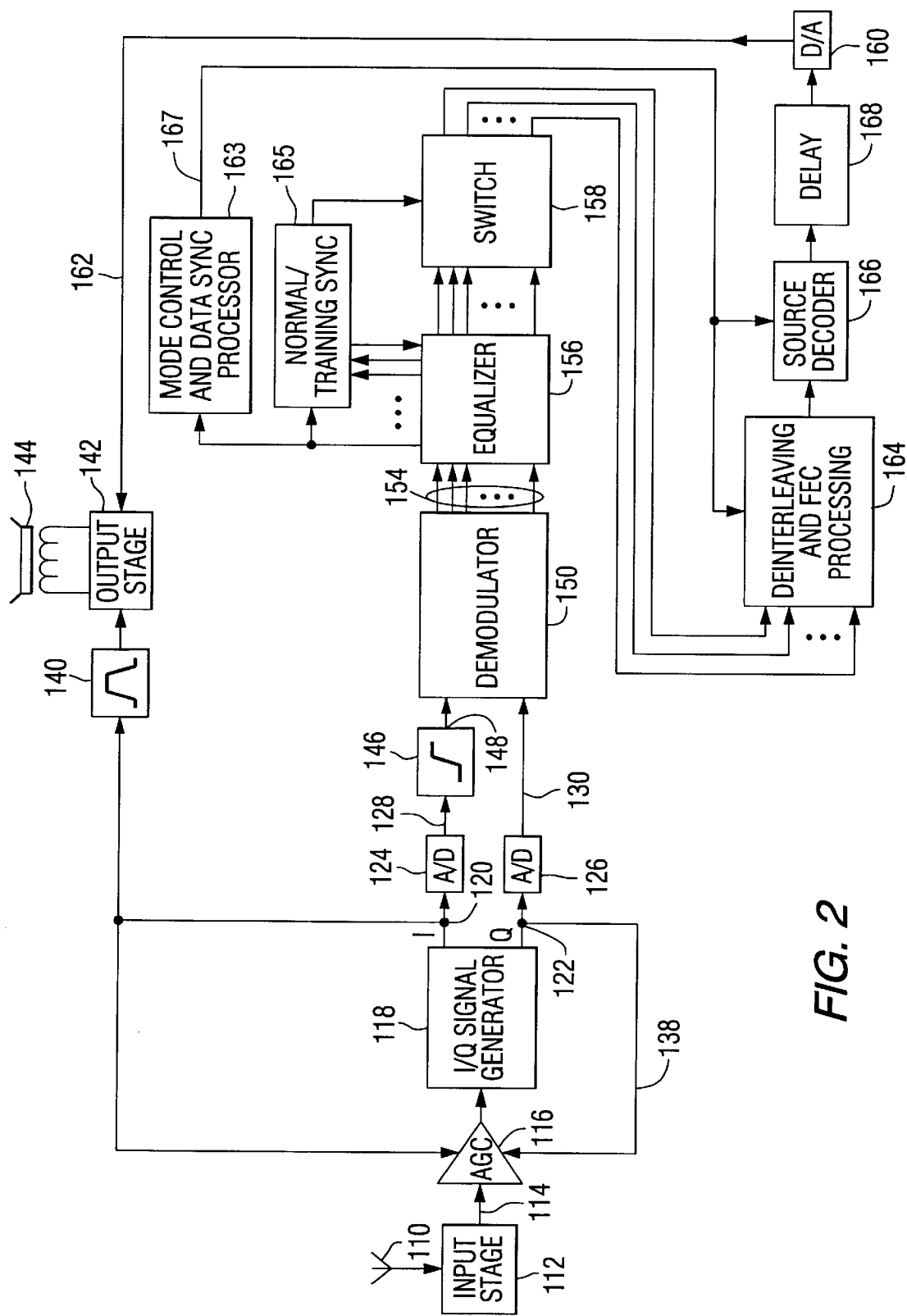
FIG. 2 is a block diagram of a receiver that may include the SNR estimation of this invention.

FIG. 2 is a block diagram of a receiver constructed to receive the composite digital and analog signals of FIG. 1. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 120 and 122 are used to control the automatic gain control circuit 116. The signal on line 120 includes the analog AM signal which is separated out as illustrated by block 140 and passed to an output stage 142 and subsequently to a speaker 144 or other output device.

An optional highpass filter 146 may be used to filter the in-phase components on line 128 to eliminate the energy of the analog AM signal and to provide a filtered signal on line 148. If the highpass filter is not used, the signal on line 148 is the same as that on line 128. A demodulator 150 receives the digital signals on lines 148 and 130, and produces output signals on lines 154. These output signals are passed to an equalizer 156 and to a switch 158. To obtain higher signal-to-noise ratios (SNR) for the complementary carriers, the FFT outputs for pairs of complementary carriers are combined. The output of the switch is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align the analog and digital signals at the receiver. The output of delay circuit 168 is converted to an analog signal by a digital-to-analog converter 160 to produce a signal on 162 which goes to the output stage 142. Additional control features are provided by a mode control and data synchronization processor 163 and a normal/training synchronization block 165. Mode control and data synchronization processor 163 processes the control information and determines the audio encoding rate and the boundaries of the inner interleaver. Normal/training synchronization block determines if the received baud is a normal baud or a training baud.

Figure 3:
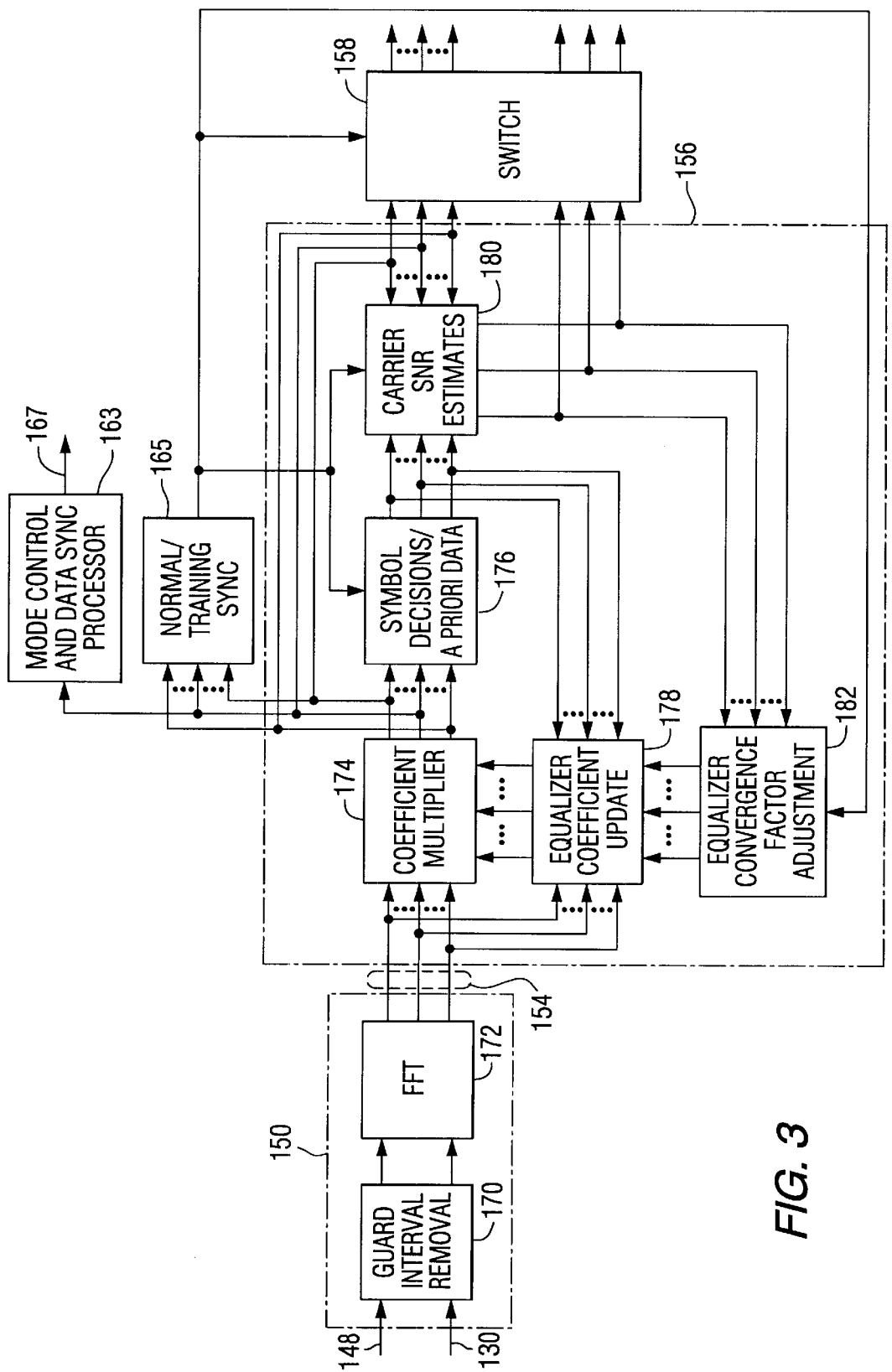
FIG. 3 is a functional block diagram which illustrates the operation of a demodulator and adaptive equalizer using the SNR estimation method of this invention.

FIG. 3 is a functional block diagram that illustrates the operation of a demodulator 150 and an adaptive equalizer 156 in accordance with the present invention. The SNR estimates can be used to control the convergence factors of an equalizer to permit rapid response to channel changes when the SNR is high and robustness against noise when the SNR is low. Also, the SNR estimates can be used in the error correction processing to obtain improved performance. Both in-phase (I) and quadrature (Q) signals are provided on lines 148 and 130 as inputs to a windowing and guard interval removal circuit 170. These signals may be provided by using down converter elements similar to those shown in FIG. 2. The window should be applied such that the digital carriers remain orthogonal, or at least the lack of orthogonality among the digital carriers is small enough not to impact system performance. The I and Q signals are synchronized to the transmitted baud intervals and each baud is input to an FFT circuit 172. In some cases it may be advantageous to perform the windowing and guard band removal operations prior to processing by highpass filter 146. The outputs from the windowing and guard interval removal circuit 170 are input to the FFT 172. The output of the FFT is input by way of lines 154 to the coefficient multiplier 174. The coefficient multiplier adjusts the magnitude and phase of the data for each digital carrier to compensate for channel effects, transmitter and receiver filtering, and other factors that can affect the magnitude and phase of the received digital information. The coefficient multiplier output is used to make symbol decisions, which determines the constellation point that was transmitted. Processor 176 determines which of the frequency domain constellation points was transmitted. These decisions, along with the pre-equalized constellation points and the previous values of the equalizer coefficients are used to update the equalizer coefficients as illustrated by block 178. Block 178 can utilize a known algorithm such as the least mean squares (LMS) or recursive least squares (RLS) to update the equalizer coefficients.

This invention is particularly applicable to receivers that use trellis coded modulation and make use of the SNR of the information at the input to the trellis decoder. The invention includes a method in which two estimates of the SNRs for the carriers in an OFDM digital audio broadcasting system are calculated, one based on the received digitally encoded audio information and one based on the received training sequences. The more reliable one of the SNR estimates is chosen and used to perform hypotheses testing for typical interference scenarios and possibly improve the estimates so that the more reliable estimates can be used in the trellis decoder. The more reliable estimate can also be used to set the convergence factors in an equalizer.

U.S. Pat. No. 5,559,830 describes one mode of operation for an equalizer having an equalizer coefficient update algorithm. The present invention enhances the operation of the equalizer and equalizer coefficient update algorithm by estimating the SNR as illustrated in block 180. Block 182 illustrates that the SNR estimates are used to adjust the equalizer convergence factor. The SNR estimates can also be used to improve the performance of the error correction processing. Error correction that uses convolutional or turbo codes and trellis coded modulation are examples of cases where the SNR estimates can be used to improve the error correction performance. As shown in FIGS. 2 and 3, the carrier SNR estimates from block 180 are input to a switch 158. When the current baud is determined to be a normal baud by block 165, the switch passes the carrier SNR estimates to the deinterleaving and FEC processing block 164.

Figure 4:
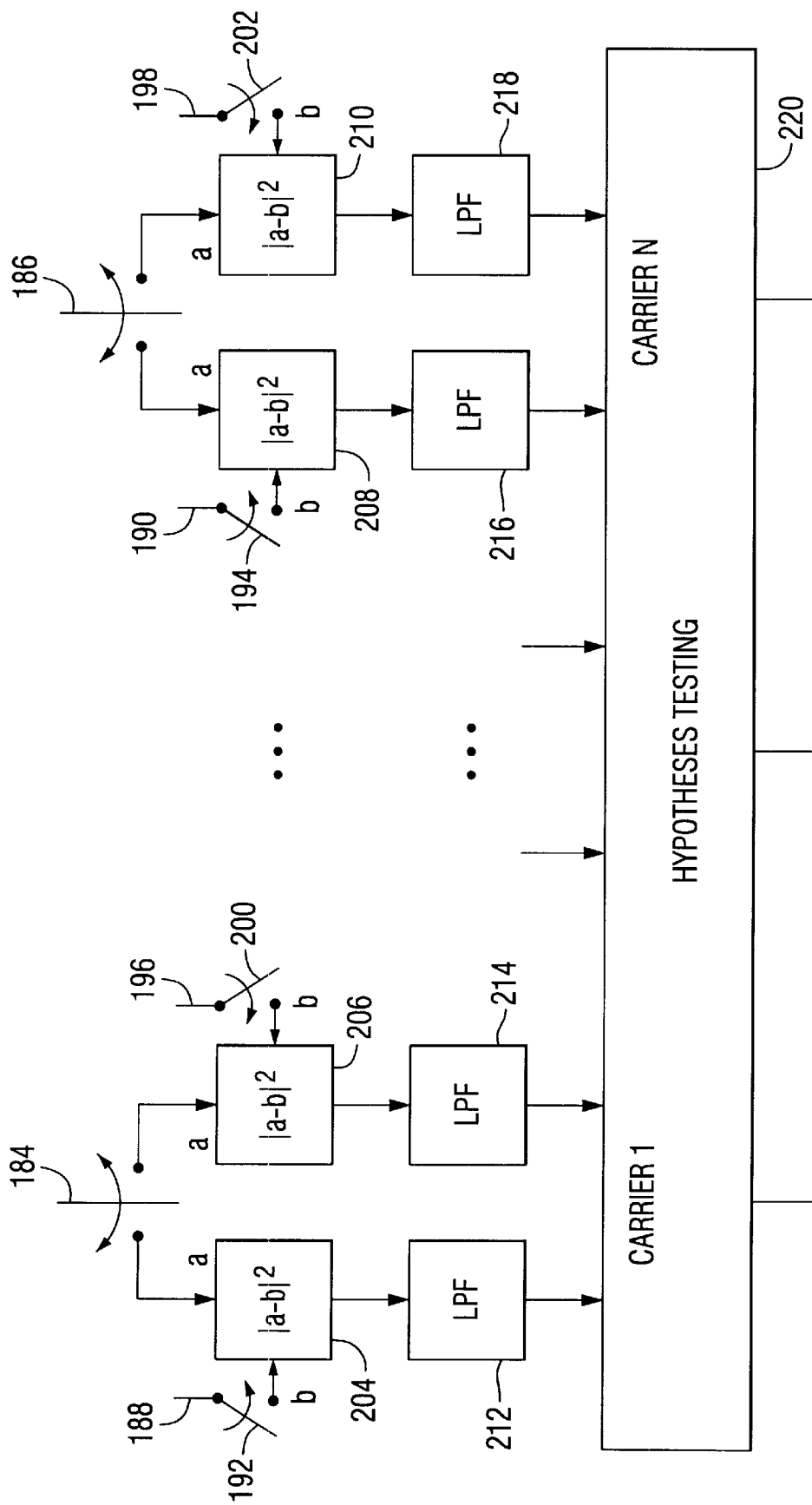
FIG. 4 is a functional block diagram which illustrates the method of SNR estimation of this invention.

As shown in FIG. 3, the symbol decision information and the equalized frequency domain data are used to estimate the SNR for the digital carriers. The operation of the carrier SNR estimate processing is detailed in FIG. 4. For each digital carrier, the equalizer output, shown as being supplied on lines 184 and 186, is subtracted from the symbol decisions, supplied on lines 188 and 190, when a normal data baud is received by closing switches 192 and 194, or from the known training information, supplied on lines 196 and 198, when a training baud is received by closing switches 200 and 202. The result of the subtraction, which is the norm of the vectors a and b, is squared to give an estimate of the power of the noise, as illustrated in blocks 204, 206, 208 and 210. Note that when the symbol decisions are correct, such as will be the case when the received SNR is high, the information from the normal data baud results in a good estimate of the SNR. However, when the symbol decisions are not correct, the information from the normal data baud can be unreliable and only the information from the training baud results in a good estimate of the SNR. However, because the normal data baud information is transmitted more frequently than the training baud information, it is desirable to use the normal data baud information when possible. The information from the normal and training baud actually estimates the power of the noise, but if the digital carriers are transmitted at a constant average power, the SNR can be determined by normalization of the noise power estimate. As shown in FIG. 4, lowpass filters 212, 214, 216 and 218 can be used to smooth the SNR estimates. The parameters of the lowpass filter can be adjusted such that the lowpass filter bandwidth is decreased as the number of SNR estimates is increased. Following lowpass filtering, the normal and training baud SNR estimates from all carriers are input to a hypotheses testing circuit 220.

Figure 5:
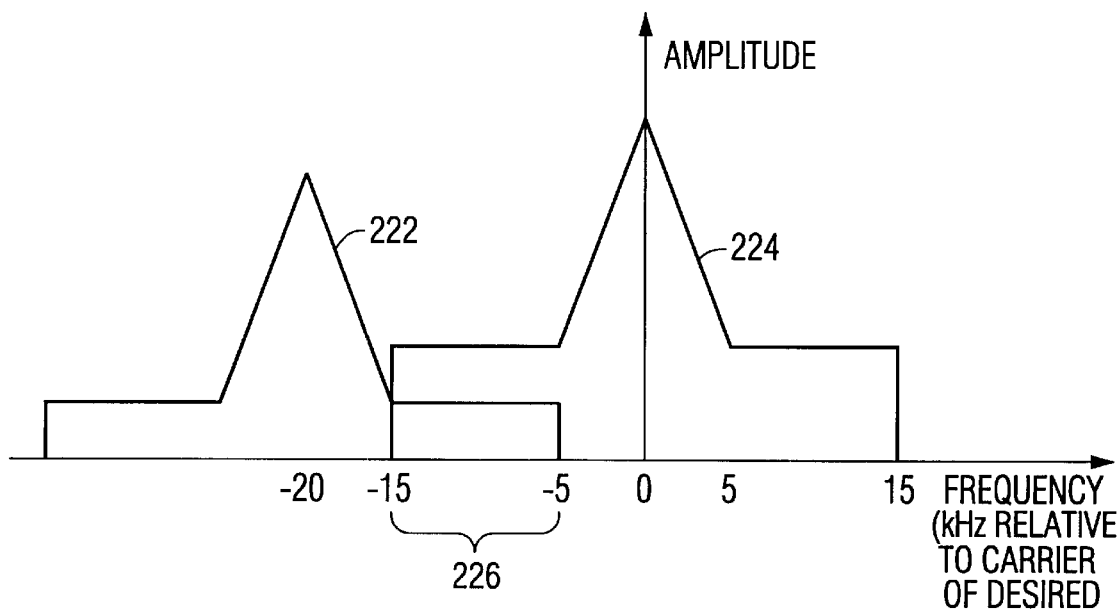
FIGS. 5 and 6 are diagrams showing the power spectral densities of interference scenarios for in-band on-channel digital audio broadcasting signals that can be processed using the method and apparatus of this invention.

The hypotheses testing circuit 220 processes the SNR information, determines the most likely interference scenario based on known typical interference scenarios in the AM band, and can improve the estimates based on the most likely interference scenario. One of the most likely scenarios is that of second adjacent channel interference. FIG. 5 shows the spectral overlap that occurs when a second adjacent interfering hybrid digital audio broadcasting signal 222 that is lower in frequency is present. As can be seen, the digital carriers from the interfering signal 222 overlap the digital carriers from the desired hybrid digital audio broadcasting signal 224 in the region 226 from about −15 kHz to about −5 kHz. A hypothesis test to determine the presence of a second adjacent interferer has been developed and simulated. The test processes the SNR estimates in two groups of about 10 kHz, with the two groups extending from about −15 kHz to about −5 kHz and about 5 kHz to about 15 kHz to detect a second adjacent station that is lower or higher in frequency, respectively. For each region, the average SNR, in dB, is calculated. If the average level is less than a preset threshold, the estimated SNR from the training baud is used for all of the carriers in that region because the estimated SNR from the normal baud may be inaccurate. Conversely, if the average level is greater than the preset threshold, the SNR estimates from the normal baud are used. The advantage of comparing the average SNR over a 10 kHz region to a threshold instead of comparing each carrier to a threshold is that when a second adjacent interferer is present the average over the 10 kHz region gives an SNR estimate with a lower variance.

Figure 6:
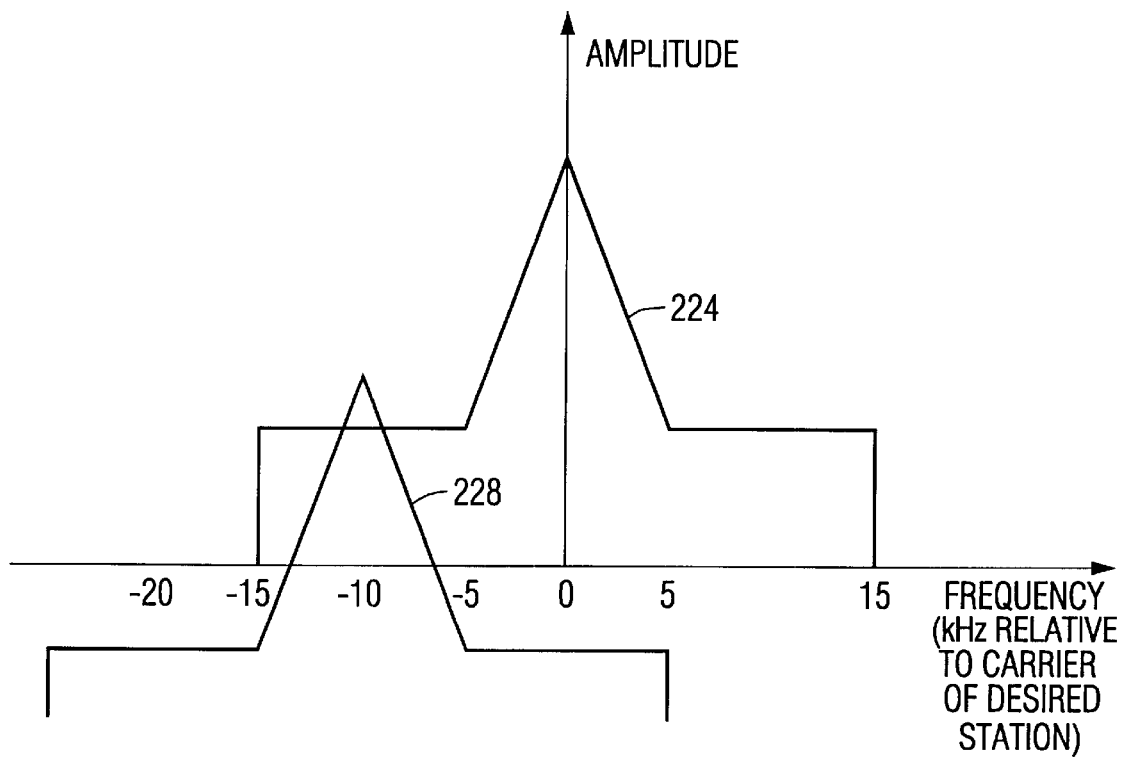

Similar hypotheses tests can be developed for other typical interference scenarios such as third adjacent, first adjacent, and co-channel interference. For example, FIG. 6 shows the spectral overlap that occurs when a first adjacent interfering hybrid digital audio broadcasting signal 228 is present. Because there is no digital carrier at about ±10 kHz, where a first adjacent AM carrier would be located, the presence of significant energy at this spectral location could be used as an indicator of the presence of a first adjacent station. In addition, if the SNR estimates for the digital carriers increases for carriers that are farther from this location, up to about ±5 kHz away, this would further indicate the presence of a first adjacent interferer. Also, the SNR estimates for the digital carriers about −5 kHz to about 5 kHz from the desired AM carrier could be averaged to determine the presence of the digital portion of a first adjacent interfering station. If a first adjacent interferer is determined to be present, SNR estimates for the carriers near about ±10 kHz could be calculated based on the SNR estimate of the carriers in the regions that are about 5 kHz away from the interfering AM carrier and knowledge of a typical spectral slope of the analog portion of an AM station. The advantage of this approach is that the SNRs for the digital carriers that are about 5 kHz away from the interfering AM carrier will be higher than for the digital carriers located near the interfering AM carrier, and the power spectral densities for different AM stations is similar. Processing in this manner could improve the SNR estimates in the region near the interfering AM carrier. As described above for the second adjacent interferer, the hypothesis testing could use only the training baud estimates if the data baud estimates are below a threshold.

The carrier SNR estimates are used to control the convergence factor, or adaptation constant, for the equalizer update algorithm. Each digital carrier has two associated equalizer convergence factors, one for normal baud and one for training baud. The equalizer coefficients can be updated using an algorithm such as least mean squares (LMS) or recursive least squares (RLS). These algorithms have a parameter that controls the response time to changing channel conditions. Fast response, corresponding to a large convergence factor, permits rapid tracking of channel conditions. A slower response, corresponding to a small convergence factor, allows more robust performance in the presence of noise. As shown in FIG. 3, the carrier SNR estimates are used to adjust the equalizer convergence factors. When the SNR estimate for a carrier is relatively high, its convergence factor can be large. The equalizer coefficient update algorithm relies on correct symbol decision information. Because the symbol information is known for each training baud, a larger convergence factor can be used for training baud than for normal baud because the symbol decisions will not be reliable if the carrier SNR is low. The use of this equalizer convergence factor adjustment algorithm with the carrier SNR estimate algorithm as described above has been shown to result in improved performance over systems that utilize a constant convergence factor or do not use hypotheses testing to estimate the SNR of the digital carriers. In an alternative embodiment, a combination of the two signal-to-noise ratio estimates can be used to form one signal-to-noise ratio estimate. This resulting signal-to-noise ratio estimate can be used to control the convergence factor and used in the error correction processing.

This invention provides a system for estimating SNR and adaptively equalizing an amplitude modulated compatible digital audio broadcast signal. In the foregoing specification certain preferred practices and embodiments of this invention have been set out, however, it will be understood that the invention may be otherwise embodied within the scope of the following claims.

What is claimed is:

1. A method of estimating signal-to-noise ratio (SNR) for a plurality of carriers modulated with digital information, such digital information including data baud and training baud, said method comprising the steps of:

receiving said plurality of carriers;

determining a first SNR for said data baud;

determining a second SNR for said training baud;

comparing at least one of said first SNR and said second SNR to predetermined selection criteria;

selecting one of said first SNR and said second SNR based on said comparison step.

2. The method of claim 1, wherein said step of determining a first SNR for said data baud comprises the step of estimating the noise power for said data baud and normalizing the data baud noise power; and wherein said step of determining a second SNR for said training baud comprises the step of estimating the noise power for said training baud and normalizing the training baud noise power.

3. The method of claim 1 further comprising the step of using a selected one of said first SNR and said second SNR to control a convergence factor in an equalizer.

4. The method of claim 3 wherein said first SNR is selected, and further comprising the step of using a combination of said first SNR and second SNR to control a convergence factor in said equalizer.

5. The method of claim 3 wherein said convergence factor for said training baud is larger than said convergence factor for said data baud.

6. The method of claim 1 further comprising the step of:

using a selected one of said first SNR and said second SNR to enhance error correction of said data baud.

7. The method of claim 6 wherein said first SNR is selected, and further comprising the step of using a combination of said first SNR and second SNR to enhance error correction of said data baud.

8. The method of claim 1, wherein said step of comparing at least one of said first SNR and said second SNR to predetermined selection criteria comprises the step of:

comparing said first SNR to a preselected threshold level.

9. The method of claim 1, further comprising the steps of:

processing said carriers to produce an equalizer output for each of the carriers; and processing said equalizer output to produce a symbol decision for each of the carriers;

wherein said step of determining a first SNR for said data baud includes the step of subtracting said equalizer output from said symbol decision when a data baud is received to produce a first difference value, squaring said first difference value to produce a first noise estimate, and normalizing the first noise estimate by the signal power to determine a first SNR estimate; and wherein said step of determining a second SNR for said training baud includes the step of subtracting said equalizer output from predetermined training data when a training baud is received to produce a second difference value, squaring said second difference value to produce a second noise estimate, and normalizing the second noise estimate by the signal power to determine a second SNR estimate.

10. The method of claim 1, further comprising the step of:

low pass filtering said first and second SNRs prior to the step of comparing at least one of said first SNR and said second SNR to predetermined selection criteria.

11. The method of claim 10, further comprising the step of:

reducing the bandwidth of a low pass filter used in said low pass filtering step as additional SNR determinations are made.

12. The method of claim 1, said step of determining a first SNR for said data baud includes the steps of:

estimating SNR for data baud in selected ones of said plurality carriers lying within two predetermined frequency bands;

averaging the SNRs for the data baud in said two frequency bands to produce an average SNR; and using said average SNR in said step of comparing at least one of said first SNR and said second SNR to predetermined selection criteria.

13. The method of claim 12, wherein said frequency bands are each about 10 kHz wide.

14. The method of claim 1, further comprising the step of:

detecting first adjacent signal energy at frequencies positioned at about ±10 kHz from a center channel frequency.

15. The method of claim 1, further comprising the step of:

averaging said first SNR for data baud on carriers positioned within about ±5 kHz from a center channel frequency.

16. The method of claim 1, wherein said step of determining a first SNR for said data baud includes the steps of:

estimating SNR for data baud on carriers positioned in a first frequency band from about −15 kHz to about −5 kHz from a center channel frequency, and on carriers positioned in a second frequency band from about +5 kHz to about +15 kHz from a center channel frequency; and averaging the SNRs for the data baud on carriers in said first and second frequency bands.

17. An apparatus for estimating signal-to-noise ratio (SNR) for a plurality of carriers modulated with digital information, such digital information including data baud and training baud, said apparatus comprising the steps of:

means for receiving said plurality of carriers;

means for determining a first SNR for said data baud;

means for determining a second SNR for said training baud;

means for comparing at least one of said first SNR and said second SNR to predetermined selection criteria;

means for selecting one of said first SNR and said second SNR based on said comparison step.

18. The apparatus of claim 17, wherein said means for determining a first SNR for said data baud comprises means for estimating the noise power for said data baud and normalizing the data baud noise power; and wherein said means for determining a second SNR for said training baud comprises means for estimating the noise power for said training baud and normalizing the training baud noise power.

19. The apparatus of claim 17, further comprising means for using a selected one of said first SNR and said second SNR to control a convergence factor in an equalizer.

20. The apparatus of claim 19, further comprising means for using a combination of said first SNR and said second SNR to control a convergence factor in said equalizer.

21. The apparatus of claim 19, wherein said convergence factor for said second SNR is larger than said convergence factor for said first SNR.

22. The apparatus of claim 17, further comprising means for using a selected one of said first SNR and said second SNR to enhance error correction of said data baud.

23. The apparatus of claim 22, further comprising means for using a combination of said first SNR and second SNR to enhance error correction of said data baud.

24. The apparatus of claim 17, wherein said means for comparing at least one of said first SNR and said second SNR to predetermined selection criteria comprises:

means for comparing said first SNR to a preselected threshold level.

25. The apparatus of claim 17, further comprising:

means for processing said carriers to produce an equalizer output for each of the carriers; and means for processing said equalizer output to produce a symbol decision for each of the carriers;

wherein said means for determining a first SNR for said data baud includes means for subtracting said equalizer output from said symbol decision when a data baud is received to produce a first difference value, means for squaring said first difference value to produce a first noise estimate, and normalizing the first noise estimate by the signal power to determine a first signal to noise estimate; and wherein said means for determining a second SNR for said training baud includes means for subtracting said equalizer output from predetermined training data when a training baud is received to produce a second difference value, means for squaring said second difference value to produce a second noise estimate, and normalizing the second noise estimate by the signal power to determine a second signal to noise estimate.

26. The apparatus of claim 17, further comprising:

means for low pass filtering said first and second SNRs prior comparing at least one of said first SNR and said second SNR to predetermined selection criteria.

27. The apparatus of claim 26, further comprising:

means for reducing the bandwidth of a low pass filter used in said low pass filtering step as additional SNR determinations are made.

28. The apparatus of claim 17, wherein said means for determining a first SNR for said data baud includes:

means for estimating SNR for data baud in selected ones of said plurality carriers lying with two predetermined frequency bands;

means for averaging the SNRs for the data baud in said two frequency bands to produce an average SNR; and means for using said average SNR in said means for comparing at least one of said first SNR and said second SNR to predetermined selection criteria.

29. The apparatus of claim 28, wherein said frequency bands are each about 10 kHz wide.

30. The apparatus of claim 17, further comprising:

means for detecting first adjacent signal energy at frequencies positioned at about ±10 kHz from a center channel frequency.

31. The apparatus of claim 17, further comprising:

means for averaging said first SNR for data baud on carriers positioned within about ±5 kHz from a center channel.

32. The apparatus of claim 17, said means for determining a first SNR for said data baud includes:

means for estimating SNR for data baud on carriers positioned in a first frequency band from about −15 kHz to about −5 kHz from a center channel frequency, and on carriers positioned in a second frequency band from about +5 kHz to about +15 kHz from a center channel frequency; and means for averaging the SNRs for the data baud on carriers in said first and second frequency bands.

33. An apparatus for estimating signal-to-noise ratio (SNR) for a plurality of carriers modulated with digital information, such digital information including data baud and training baud, said apparatus comprising:

an input for receiving said plurality of carriers;

an SNR processor for determining a first SNR for said data baud, and for determining a second SNR for said training baud;

a comparator for comparing at least one of said first SNR and said second SNR to predetermined selection criteria, and for selecting one of said first SNR and said second SNR based on said comparison.

34. The apparatus of claim 33, wherein said SNR processor estimates noise power for said data baud, normalizes the data baud noise power, estimates noise power for said training baud, and normalizes the training baud noise power.

35. The apparatus of claim 33, further comprising an equalizer using a convergence factor responsive to the selected one of said first SNR and said second SNR.

36. The apparatus of claim 35, further comprising a combiner for producing a combination of said first SNR and said second SNR to control a convergence factor in said equalizer.

37. The apparatus of claim 33, wherein said comparator compares said first SNR to a preselected threshold level.

38. The apparatus of claim 33, further comprising:

an equalizer for processing said carriers to produce an equalizer output for each of the carriers; and a decision processor for processing said equalizer output to produce a symbol decision for each of the carriers;

wherein said SNR processor subtracts said equalizer output from said symbol decision when a data baud is received to produce a first difference value, squares said first difference value to produce a first noise estimate, normalizes the first noise estimate by the signal power to determine a first signal to noise estimate, subtracts said equalizer output from predetermined training data when a training baud is received to produce a second difference value, squares said second difference value to produce a second noise estimate, and normalizes the second noise estimate by the signal power to determine a second signal to noise estimate.

39. The apparatus of claim 33, further comprising:

a filter for low pass filtering said first and second SNRs prior comparing at least one of said first SNR and said second SNR to predetermined selection criteria.

40. The apparatus of claim 33, wherein said SNR processor estimates SNR for data baud in selected ones of said plurality carriers lying with two predetermined frequency bands, averages the SNRs for the data baud in said two frequency bands to produce an average SNR, and uses said average SNR in said comparator for comparing at least one of said first SNR and said second SNR to predetermined selection criteria.

41. The apparatus of claim 40, wherein said frequency bands are each about 10 kHz wide.

42. The apparatus of claim 33, further comprising:

a detector for detecting first adjacent signal energy at frequencies positioned at about ±10 kHz from a center channel frequency.

43. The apparatus of claim 33, wherein said SNR processor averages said first SNR for data baud on carriers positioned within about ±5 kHz from a center channel frequency.

44. The apparatus of claim 33, wherein said SNR processor estimates SNR for data baud on carriers positioned in a first frequency band from about −15 kHz to about −5 kHz from a center channel frequency, and on carriers positioned in a second frequency band from about +5 kHz to about +15 kHz from a center channel frequency; and averages the SNRs for the data baud on carriers in said first and second frequency bands.

* * * * *

UNITED STATES PATENT AND TRADEMARK OFFICE
CERTIFICATE OF CORRECTION

PATENT NO. : 6,532,258 B1
DATED : March 11, 2003
INVENTOR(S) : Don Roy Goldston and Marcus Matherne It is certified that error appears in the above-identified patent and that said Letters Patent is hereby corrected as shown below:

Column 3,
Line 44, "channel. The transmitted signal includes of the current" should read
-- channel. The transmitted signal includes the current --.

Column 9,
Line 65, "and training baud, said apparatus comprising the steps of" should read -- and training baud, said apparatus comprising --.

Signed and Sealed this

Twelfth Day of October, 2004

JON W. DUDAS
*Director of the United States Patent and Trademark Office*